(12) United States Patent
Willis et al.

(10) Patent No.: US 9,165,351 B1
(45) Date of Patent: Oct. 20, 2015

(54) METHOD AND APPARATUS FOR GAME ANIMAL VISION

(71) Applicant: Infinite Eyes, LLC, Tupelo, MS (US)

(72) Inventors: Samuel S. Willis, Tupelo, MS (US); William T. Simpson, Tupelo, MS (US)

(73) Assignee: Infinite Eyes LLC

( * ) Notice: Subject to any disclaimer, the term of this patent is extended or adjusted under 35 U.S.C. 154(b) by 235 days.

(21) Appl. No.: 13/803,286

(22) Filed: Mar. 14, 2013

(51) Int. Cl.
| | |
|---|---|
| *G06K 9/00* | (2006.01) |
| *G06T 5/40* | (2006.01) |
| *H04M 1/725* | (2006.01) |
| *G06T 7/40* | (2006.01) |
| *G06K 9/46* | (2006.01) |

(52) U.S. Cl.
CPC .............. *G06T 5/40* (2013.01); *G06K 9/00496* (2013.01); *G06K 9/4652* (2013.01); *G06T 7/408* (2013.01); *H04M 1/72522* (2013.01); *G06T 2207/10024* (2013.01)

(58) Field of Classification Search
CPC ...... G06T 7/408; G06T 2207/10024; G06K 9/00496; G06K 9/4652
USPC .................................... 382/100, 167
See application file for complete search history.

(56) References Cited

U.S. PATENT DOCUMENTS

| | | | | |
|---|---|---|---|---|
| 5,409,760 | A * | 4/1995 | Neitz et al. | 428/195.1 |
| 5,541,735 | A | 7/1996 | Rengle | |
| 5,589,898 | A * | 12/1996 | Atkinson | 351/237 |
| 5,684,563 | A * | 11/1997 | White | 355/32 |
| 6,985,524 | B1 * | 1/2006 | Borchers | 375/240 |
| 7,189,128 | B2 | 3/2007 | Halliday | |
| 7,420,749 | B2 | 9/2008 | Grant et al. | |
| 8,792,138 | B2 * | 7/2014 | Boggs et al. | 358/3.24 |
| 2004/0194188 | A1 * | 10/2004 | Tooley | 2/69 |
| 2007/0200337 | A1 | 8/2007 | Johnson et al. | |
| 2009/0017267 | A1 * | 1/2009 | Burrell | 428/195.1 |
| 2012/0055064 | A1 | 3/2012 | Pringle et al. | |

OTHER PUBLICATIONS

CreatureVision for iPhone 3GS, iPhone 4, iPhone 4S, iPod touch (4th generation), iPad 2 Wi-Fi, iPad 2 Wi-Fi + 3G, iPad (3rd generation) and iPad Wi-Fi + 4G on the iTunes App Store (2 pages), circa 2011.
CreatureVision _ Mooshwerks, (2 pages), circa 2011.
Dog vision—Android Apps on Google Play,(2 pages), circa 2012.
Dog vision _ AppBrain Android Market, (2 pages), circa 2012.

* cited by examiner

*Primary Examiner* — Utpal Shah
(74) *Attorney, Agent, or Firm* — Mark D. Perdue

(57) ABSTRACT

A method and apparatus for obtaining a digital image of a selected scene and analyzing the image, utilizing an image processor, for selected frequencies of light in the image. The selected frequencies are converted, utilizing the image processor, to different selected frequencies to obtain an image representative of how a game animal sees the selected scene. The converted or representative image then is displayed.

17 Claims, 5 Drawing Sheets

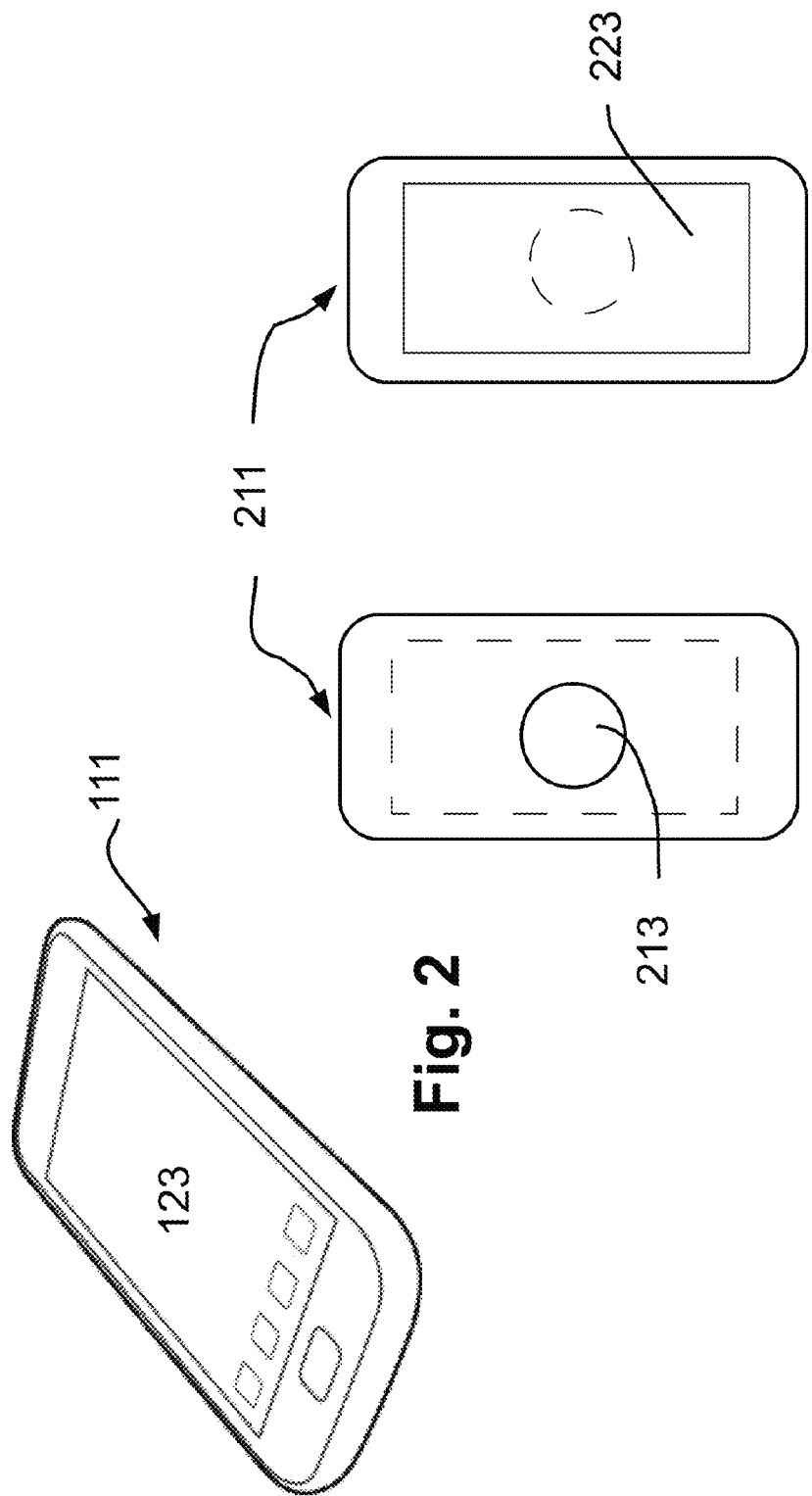

METHOD AND APPARATUS FOR GAME ANIMAL VISION

BACKGROUND OF THE INVENTION

1. Technical Field

The present invention relates generally to vision and imaging devices and methods for use by hunters and more particularly to such devices and methods that permit hunters and other outdoorsmen and women to evaluate their concealment from game animals.

2. Summary of the Prior Art

Hunters and other outdoorsmen and women, including fishermen, birdwatchers, photographers, and others, have long attempted to conceal themselves from their quarry or game using camouflage, blinds, and other concealment methods. Millions if not billions are spent annually by outdoorsmen on camouflage clothing and related items used to conceal them and their equipment from their quarry.

When hunting wild game animals, for example, hunters normally use camouflage clothing, tree stands, ground blinds, shooting houses, or any means of putting the odds in the hunter's favor of harvesting prey. Such game would include includes mammals such as whitetail deer, and elk; avian species such as turkey, waterfowl and other birds; and fish and reptiles, such as largemouth bass and alligator. Hunters use the tools mentioned above to attempt to blend into the surroundings and terrain in which they are hunting. They attempt to deceive the keen senses of the animal they pursue by disguising or masking themselves from detection by the animal prey or quarry, whether it is by sight, smell, or hearing.

It is well-known that animals have different vision than humans. In many areas, particularly low-light conditions, it is more acute than that of humans; and in others, particularly perception of colors, it is less acute. All animals see in different wavelengths or frequencies, due to different types and numbers of rods and cones in the eye. For instance the whitetail deer, the most-hunted big game animal in North America, is red and green colorblind, but can see in the ultra violet spectrum. This also enhances the sight of said animal in low light and even total dark conditions.

Accordingly, wild game can be difficult to deceive. Most camouflage and concealment items are evaluated using human vision. Because human vision differs from animal vision, these evaluations often are flawed and what appears to be good concealment actually is not at all. Therefore, when an outdoorsman or woman is in a situation where the wind and other scent factors are in his favor, his camouflage, tree stand, ground blind, etc. may not have him completely hidden from the animal he is pursuing.

Prior attempts have been made to utilize this knowledge to improve camouflage and concealment. U.S. Patent Publication No. 2012/0055064 to Pringle et al. discloses a method of creating a surface composition utilizing animal vision data. U.S. Pat. No. 7,420,749 to Grant, et al. and U.S. Pat. No. 5,541,735 to Rengle disclose optical devices that employ lenses and filters and the like to purportedly view objects and scenes in the manner in which animals view them.

A need exists for a better and more accurate way to see and examine the gear employed by outdoorsmen and women and to evaluate their concealment schemes in order to conceal themselves from game animals or quarry.

SUMMARY OF THE INVENTION

It is a general object of the present invention to provide a method and apparatus for evaluation camouflage and concealment schemes by permitting a user to visualize a scene in the same way as a game animal. This and other objects of the present invention are achieved by providing a method comprising the steps of obtaining a digital image of a selected scene and analyzing the image, utilizing an image processor, for selected frequencies of light in the image. The selected frequencies are converted, utilizing the image processor, to different selected frequencies to obtain an image representative of how a game animal sees the selected scene. The converted or representative image then is displayed.

According to one embodiment of the invention, the step of obtaining a digital image of a selected scene comprises the step of taking a digital photograph of the selected scene.

According to another embodiment of the invention, the step of obtaining the digital image comprises the step of retrieving the image from memory.

According to one embodiment of the invention, the step of converting the selected frequencies further comprises the steps of scanning the image for presence of selected hexadecimal color values; and replacing the selected hexadecimal color values with hexadecimal color values representing animal vision.

According to one embodiment of the invention, the game animal is a whitetail deer.

The present invention also provides an apparatus for carrying out the method described above, which comprises an image sensor configured to obtain an image of a selected scene. A processor is configured to analyze the stored image for selected frequencies of light in the image and to convert the selected frequencies to different selected frequencies to obtain an image representative of how a game animal sees the selected scene. A display is configured to display the representative image.

According to one embodiment of the invention, the image sensor, processor, and display are in a camera phone that is programmed to analyze the image and convert the selected frequencies by an application.

According to another embodiment of the invention, the image sensor, processor, and display are in a dedicated device.

According to one embodiment of the invention, the device includes memory to store the image of the selected scene and/or the converted, representative image.

BRIEF DESCRIPTION OF THE DRAWINGS

FIG. 2 is a depiction of a smartphone device according to the present invention.

FIGS. 3A and 3B are illustrations of a dedicated device according to the present invention.

FIG. 5 is a chart showing color or frequency replacements for conversion of images according to the present invention for whitetail deer vision.

FIG. 6 is a chart showing color or frequency replacements for conversion of images according to the present invention for wild turkey vision.

DETAILED DESCRIPTION OF THE INVENTION

Figure 1:
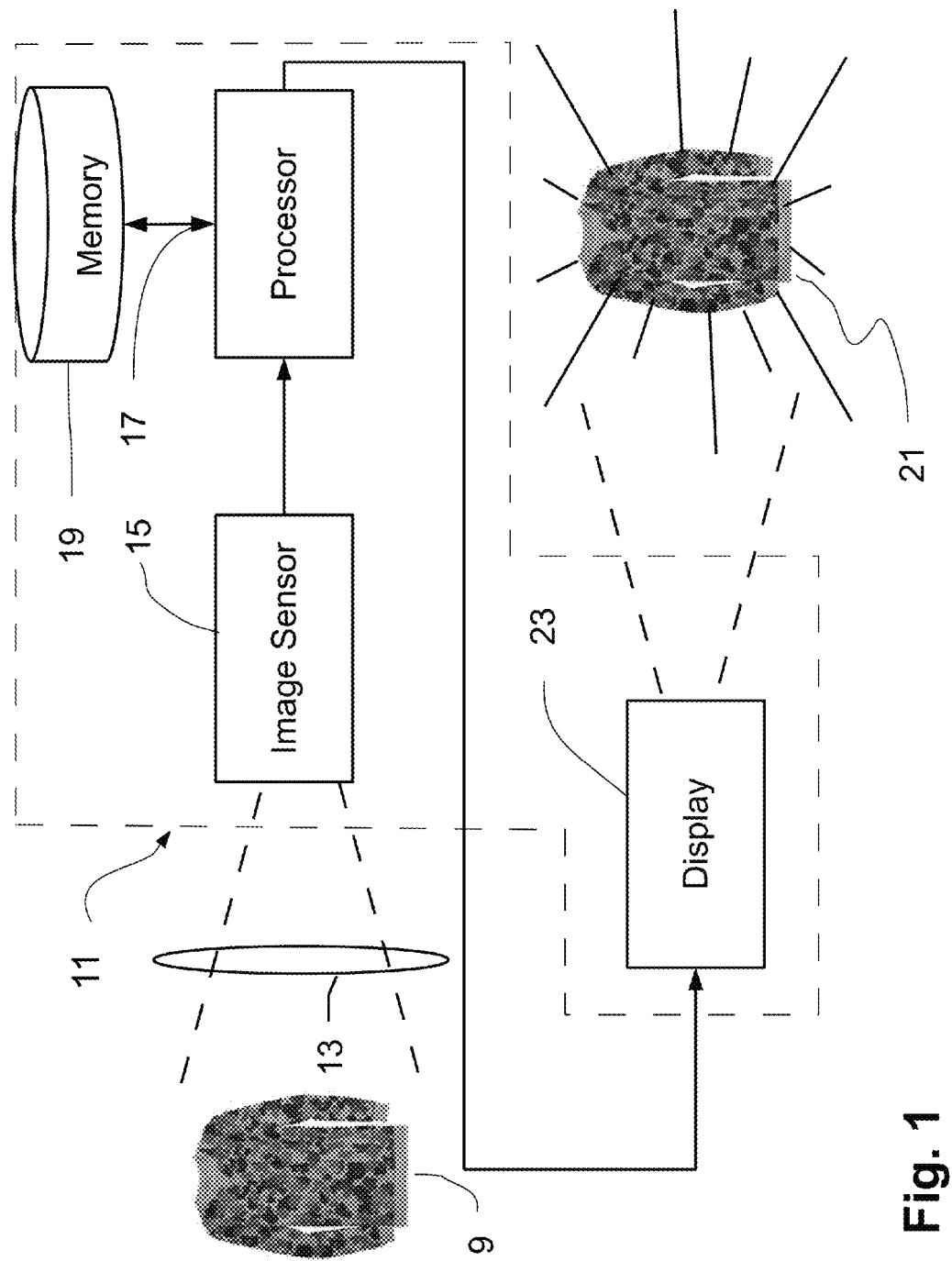
FIG. 1 is a block diagram of the components of a device according to the present invention.

FIG. 1 is a schematic representation of an embodiment of a game animal vision or imaging device 11 according to the present invention. Device 11 obtains an image of an object or scene of interest 9, in this example an article of camouflage clothing. Light representing the image of camouflage clothing 9 is gathered through an objective lens 13 and projected onto an image sensor 15. Image sensor 13 may be a conventional CMOS or CCD device that converts light projected onto the sensor into a digital image or digital data representing the image. The data representing the image is passed to a processor 17, which may be a dedicated processor or the appropriately programmed processor of a more general-purpose device, such as a "smartphone." Processor 17 then converts the image data, which is conventionally obtained using human-visible spectral light, to an image representative of how a game animal "sees" or visualizes the image of camouflage clothing 9, as discussed in greater detail with reference to FIGS. 4 and 5, below. The converted or representative digital image 19 then is displayed on a screen 21. The digital images, both before and after conversion, may also be stored in memory (RAM or removable storage) for later viewing. As described below, the image displayed may either be a static image akin to a photograph, or a dynamic, moving "live view" near-real-time image of whatever objective lens 13 is "viewing."

While FIG. 1 represents the basic components of a device according to the present invention, the physical configuration of the device can take several forms. By way of example, FIG. 2 illustrates a camera-equipped smartphone 111, such as an Apple® iPhone®, an Android® device, or Windows Mobile® phone. Such devices have lenses and image sensors as part of their cameras, as well as displays 121, and their processors may be programmed by a separately provided "app" or application to convert digital images to representative images in accordance with the invention.

Alternatively, FIGS. 3A and 3B illustrate a dedicated device 211, with an objective lens 213 on one side of a body and a display 221 on the other (the lens and display could also be on the same side of the body). The body contains the appropriately programmed processor and memory to accomplish conversion of the images for display. Such a dedicated device has no other purpose than to obtain and display converted images (although it could function as a crude camera). It is intended to be a low-cost alternative for those who do not own "smartphones" or similar devices or for those who simply desire a dedicated device (perhaps not wishing to carry an expensive device into the wild). Such a device may include a power switch and a mode switch if it is programmed for multiple game animals, permitting the user to select, for example, deer, turkey, or bass.

Figure 4:
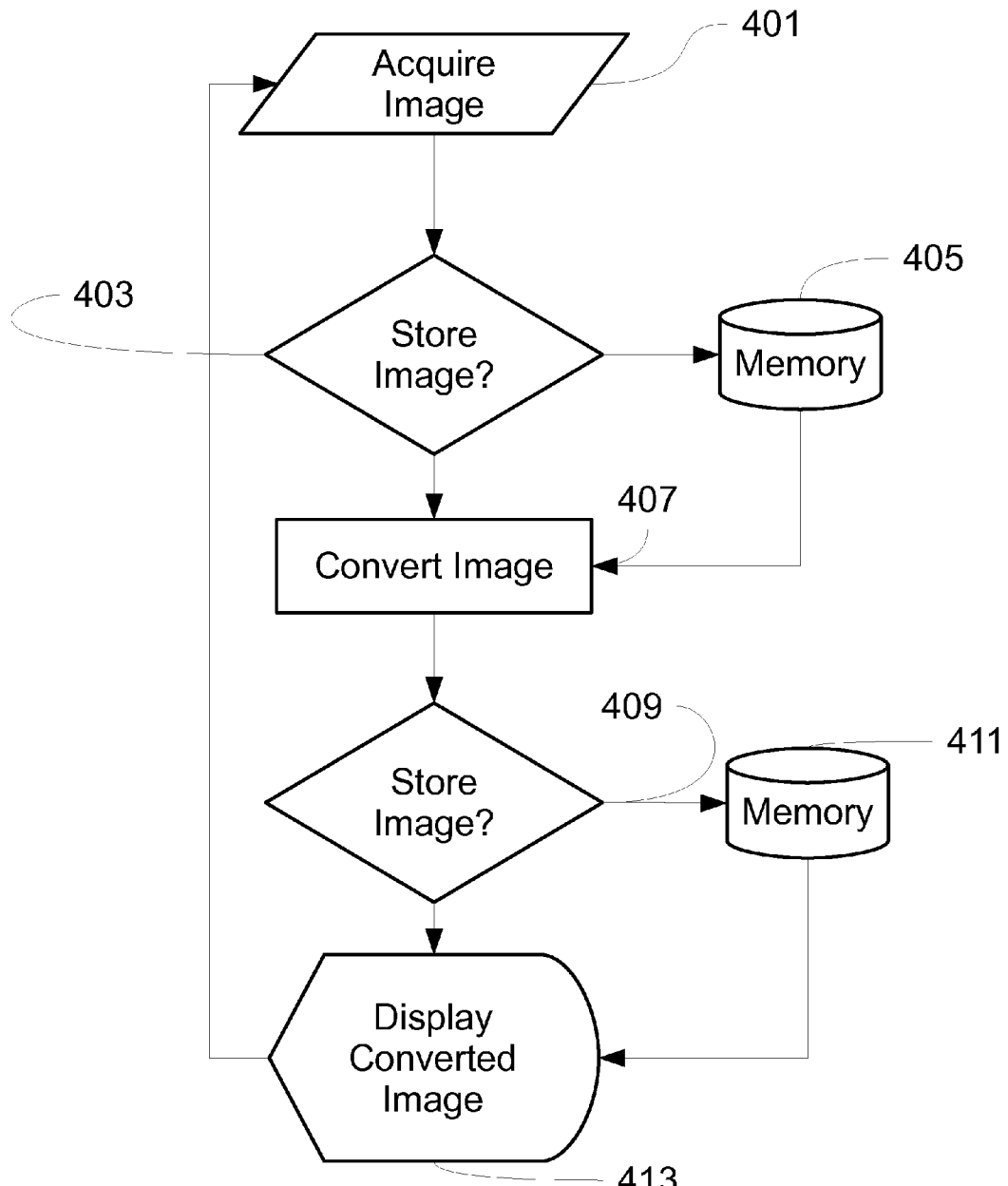
FIG. 4 is a flowchart illustrating the steps of the method or process according to the present invention.

FIG. 4 is a flowchart of the basic process according to the present invention. At step 401, a digital image is acquired by lens 13 and image sensor 15. The acquisition may be by "taking" a still image using the camera functions, a "live view" moving image of whatever image or scene 9 objective lens 13 gathers, or a still image previously "taken" or acquired and stored in memory. At step 403, the image may be stored in device memory. This may be an option presented to the user, or may be automatic depending upon device capability and design choice (for example, a dedicated device such as that in FIGS. 3A and 3B may have insufficient memory to store images, in which case, only a "live view" image is presented, whereas a "smartphone" with greater input capability and memory may present the option to store the image or may do so automatically, without user intervention).

At step 405, the acquired image is converted by processor 17. The "conversion" step is described in greater detail below with reference to the charts for conversion of colors or frequencies of light from those detected by the human eye to those detected by various game animals. Conversion may be accomplished by analyzing for and detecting the presence of certain colors (frequencies or wavelengths) in the acquired image and replacing them with selected colors (frequencies) according to a look-up table, or by a mathematical algorithm for color replacement. According to a preferred embodiment of the present invention, the acquired image is scanned or analyzed for selected hexadecimal color or frequency representations. If the scanned value is within 10% of a selected human color or frequency hexadecimal value, it is replaced with a selected animal color or frequency value. The conversion step 405 produces a converted or representative image, which has colors as perceived by a game animal rather than a human.

At step 409, the converted or representative image may be stored in device memory. As with the acquired image, whether to store the converted or representative image is a function of device capability and user and designer choice. Finally, at step 411, the converted or representative image 21 of the scene is displayed 23 to the user. The displayed converted image permits the user to perceive the image as an animal would so that the user may evaluate the effectiveness of his or her camouflage or other concealment techniques. The converted image is thus a representative image, that represents the image as seen by a game animal.

Additionally, the display step may include "flashing" or repeatedly alternating the acquired or unconverted image with the converted or representative image at a selected rate, for example, one second of display of the acquired, unconverted image followed by one second of display of the converted or representative image, the flashing or alternating continuing or repeating for a set or user-set interval, for example ten seconds or until the user ends the flashing sequence. This viewing mode may assist users in comparison of the images to quickly detect subtle image differences that indicate camouflage or concealment errors or failures. This mode can be user-selected instead of static display or live view of one of the images.

Figure 5:
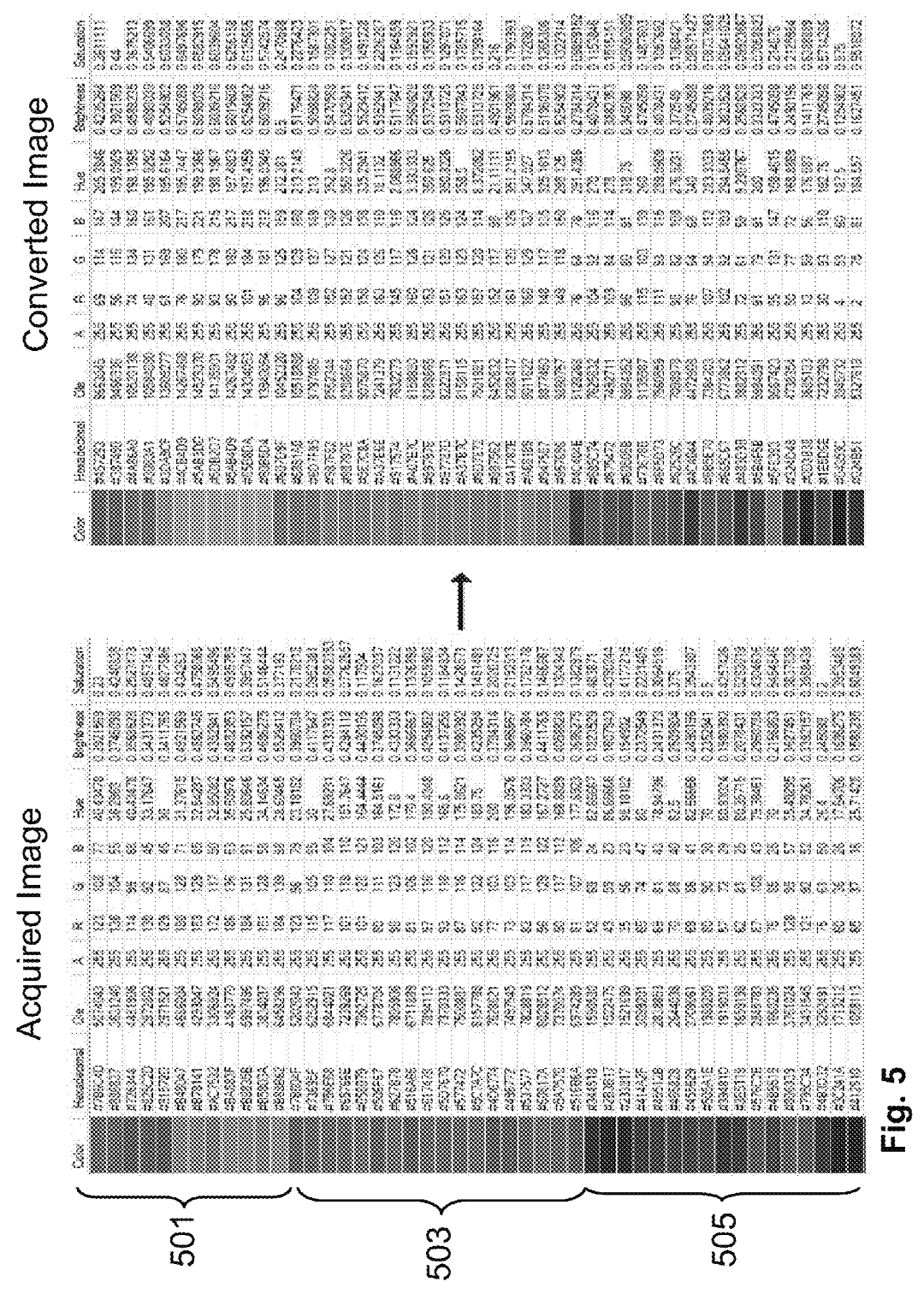

FIG. 5 is a chart showing the conversion of colors from the acquired image in the human vision domain (on the left) to a converted image representation of the vision domain of a whitetail deer. The specific color conversions or replacements can be seen from the chart itself. Processor 17 detects the presence of colors on the left side of the chart (by scanning for the hexadecimal values within +/−10%), and if present in the acquired image, replaces them with colors from the right side of the chart. The conversion for whitetail deer can be described very broadly as a "blue shift," because it shifts colors in the human-visible spectrum toward bluer frequencies.

For example, qualitatively, the colors in the upper region 501 of the chart can be described as browns in the human vision domain and are converted to blues in the deer vision domain. The colors in the middle region 503 of the chart can be described as greys in the human domain and are converted to violets or mauves in the deer domain. The colors in the bottom region 505 of the chart can be described as greens and are also converted to violets, mauves, and blues in the deer domain to produce a converted or representative image that represents what the deer sees. The color replacement chart of FIG. 5 was compiled based on data from research conducted at the Warnell School of Forest Resources at the University of Georgia by Dr. Bob Warren, Dr. Larry Marchinton and Dr. Jay Neitz from the Medical College of Wisconsin, including a paper entitled Photopigments Of White-Tailed Deer, Brian P. Murphy, Karl Miller, and R. Larry Marchinton, University of Georgia; Jess Deegan II, University of California; Jay Neitz, Medical College of Wisconsin; Gerald H. Jacobs, University of California.

Figure 6:
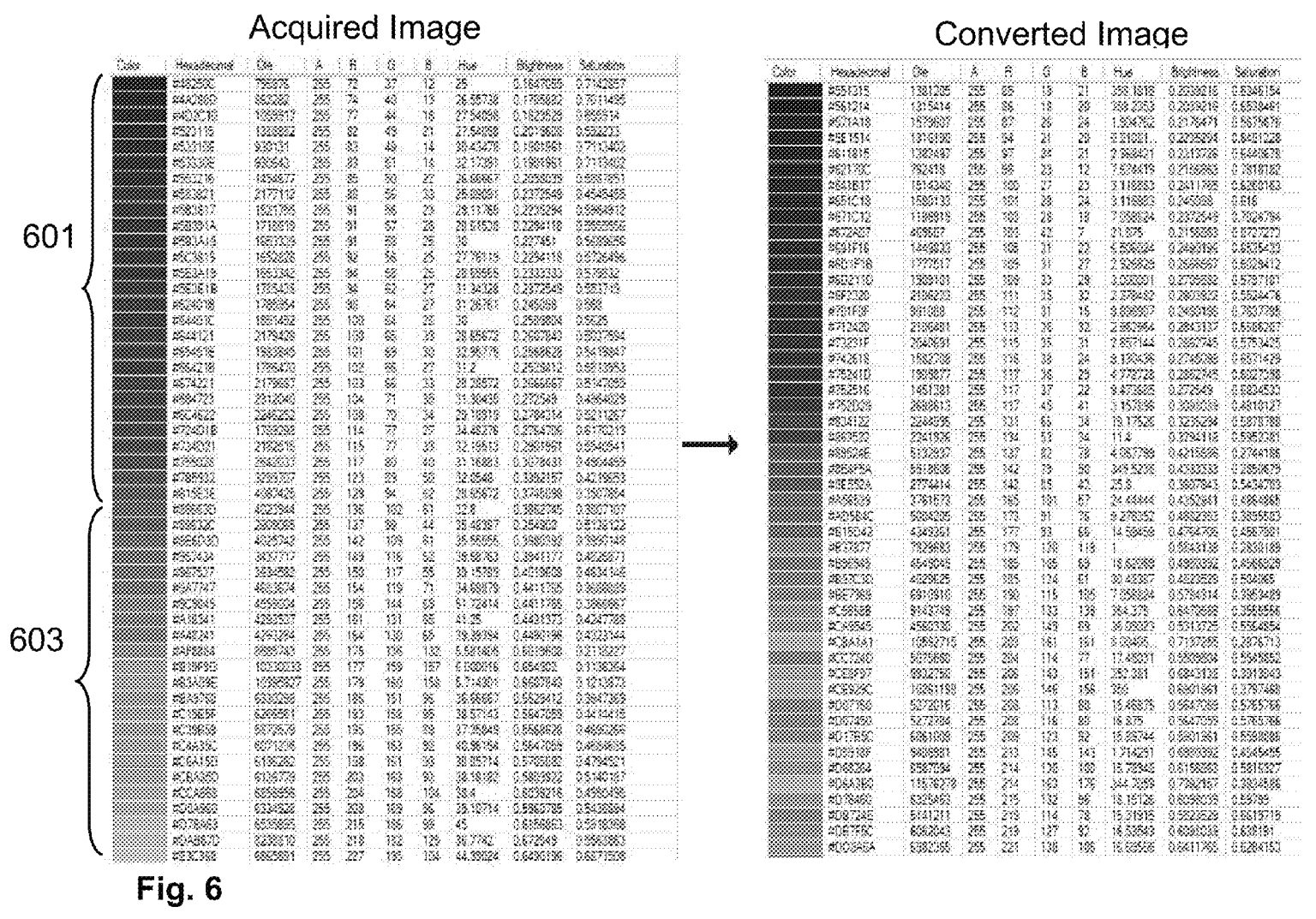

FIG. 6 is a chart showing the conversion of colors from the acquired image in the human vision domain (on the left) to a converted image representation of the vision domain of a wild turkey (on the right). The specific color conversions or replacements can be seen from the chart itself. Processor 17 detects the presence of colors on the left side of the chart (by scanning for the hexadecimal values within +/−10%), and if present in the acquired image, replaces them with colors from the right side of the chart. The conversion for wild turkey can be described very broadly as a "red or violet shift," because it shifts colors in the human-visible spectrum toward redder or more violet frequencies.

For example, qualitatively, the colors in the upper region 601 of the chart can be described as dark browns in the human vision domain and are converted to reddish browns, maroons and numbers in the turkey vision domain. The colors in the middle region 603 of the chart can be described as lighter browns and tans in the human domain and are converted to violets or mauves in the turkey domain. (In FIGS. 5 and 6, precise colors can be obtained from the hexadecimal representations without reliance on subjective color names). Similar color replacements can be effected for other game animals, using appropriate color replacement tables. The color replacement chart of FIG. 6 was compiled based in part on data and research from Complex Distribution of Avian Color Vision Systems Revealed by Sequencing the SWS1 Opsin from Total DNA, Anders Odeen and Olle Hastad, Department of Animal Ecology, Evolutionary Biology Centre, Uppsala University, Uppsala, Sweden and papers cited therein.

As described above, in operation, device 11, 111, 211 and its objective lens 13, 213 is pointed at an image 9 to be acquired. The acquired digital image is acquired by the image sensor 15 in human-visible colors and intensities. The processor 17 then replaces colors in the acquired image to produce a converted or representative image 21, which is then displayed 23 to the user for evaluation of the concealment scheme. The converted or representative image may be displayed statically, by live view, or in a flashing or alternating fashion with the acquired image. Either or both the acquired and converted or representative images may be stored in memory 19.

The present invention has a number of advantages. First, it permits the evaluation of concealment or camouflage schemes using the vision domain of game animals rather than humans, allowing much more accurate evaluation. Second, it employs the best simulations of the animal vision domains presently known to science, again insuring accuracy.

The invention has been described with reference to preferred embodiments thereof, it is thus not limited, but is susceptible to variation and modification without departing from the scope and spirit of the invention.

The invention claimed is:

1. A method comprising the steps of:
   obtaining a digital image of a selected scene;
   analyzing the image, utilizing an image processor, for selected frequencies of light in the image;
   converting the selected frequencies, utilizing the image processor, to different selected frequencies to obtain an image representative of how a game animal sees the selected scene; and
   displaying the representative image; and
   evaluating camouflage present in the digital image based on the representative image.

2. The method of claim 1, wherein the step of obtaining a digital image of a selected scene comprises the step of taking a digital photograph of the selected scene.

3. The method of claim 1, wherein the step of obtaining the digital image comprises the step of retrieving the image from memory.

4. The method of claim 1, wherein the step of converting the selected frequencies further comprises the steps of:
   scanning the image for presence of selected hexadecimal color values; and
   replacing the selected hexadecimal color values with hexadecimal color values representing animal vision.

5. The method of claim 1, wherein the game animal is a whitetail deer.

6. The method of claim 1, further comprising the step of:
   storing in memory associated with the image processor a replacement table correlating light frequencies corresponding to human vision with light frequencies corresponding to game animal vision.

7. The method of claim 6, wherein the step of converting the selected frequencies further comprises the steps of:
   scanning the image for presence of selected light frequencies; and
   utilizing the replacement table, replacing the selected light frequencies with light frequencies corresponding to animal vision.

8. The method of claim 7, wherein the light frequencies are represented by hexadecimal codes.

9. The method of claim 1, wherein the step of displaying the representative image further comprises displaying the representative image in alternation with the digital image.

10. A method of evaluating camouflage in a selected visual scene comprising the steps of:
    storing a replacement table correlating light frequencies corresponding to human vision with light frequencies corresponding to game animal vision;
    obtaining a digital image of the selected visual scene;
    analyzing the image, utilizing an image processor, for selected frequencies of light in the image;
    utilizing the replacement table, converting the selected frequencies, utilizing the image processor, to different selected frequencies to obtain an image representative of how a game animal sees the selected scene; and
    displaying the representative image; and
    evaluating the camouflage present in the digital image based on the representative image.

11. The method of claim 10, wherein the step of obtaining a digital image of a selected scene comprises the step of taking a digital photograph of the selected scene.

12. The method of claim 10, wherein the step of obtaining the digital image comprises the step of retrieving the image from memory.

13. The method of claim 10, wherein the step of converting the selected frequencies further comprises the steps of:
    scanning the image for presence of selected hexadecimal color values; and
    replacing the selected hexadecimal color values with hexadecimal color values representing animal vision.

14. The method of claim 10, wherein the game animal is a whitetail deer.

15. The method of claim 10, wherein the step of converting the selected frequencies further comprises the steps of:
    scanning the image for presence of selected light frequencies; and
    utilizing the replacement table, replacing the selected light frequencies with light frequencies corresponding to animal vision.

16. The method of claim 15, wherein the light frequencies are represented by hexadecimal codes.

17. The method of claim 10, wherein the step of displaying the representative image further comprises displaying the representative image in alternation with the digital image.

* * * * *